US009305352B2

(12) United States Patent
Jenzri et al.

(10) Patent No.: US 9,305,352 B2
(45) Date of Patent: Apr. 5, 2016

(54) DEFORMABLE TREE MATCHING WITH TANGENT-ENHANCED COHERENT POINT DRIFT

(71) Applicants: Sofiene Jenzri, Fontenay Sous Bois (FR); Parmeshwar Khurd, San Jose, CA (US)

(72) Inventors: Sofiene Jenzri, Fontenay Sous Bois (FR); Parmeshwar Khurd, San Jose, CA (US)

(73) Assignee: SIEMENS CORPORATION, Iselin, NJ (US)

( * ) Notice: Subject to any disclaimer, the term of this patent is extended or adjusted under 35 U.S.C. 154(b) by 162 days.

(21) Appl. No.: 14/068,276

(22) Filed: Oct. 31, 2013

(65) Prior Publication Data

US 2014/0153802 A1 Jun. 5, 2014

Related U.S. Application Data

(60) Provisional application No. 61/733,137, filed on Dec. 4, 2012.

(51) Int. Cl.
*G06K 9/00* (2006.01)
*G06T 7/00* (2006.01)

(52) U.S. Cl.
CPC .......... *G06T 7/0016* (2013.01); *G06T 7/0028* (2013.01); *G06T 2207/10072* (2013.01); *G06T 2207/30048* (2013.01); *G06T 2207/30061* (2013.01); *G06T 2207/30101* (2013.01)

(58) Field of Classification Search
None
See application file for complete search history.

(56) References Cited

U.S. PATENT DOCUMENTS

| 2004/0066958 A1* | 4/2004 | Chen | A61B 6/466 382/128 |
| 2007/0217665 A1* | 9/2007 | Kiraly | G06K 9/6892 382/128 |
| 2011/0085701 A1* | 4/2011 | Kitamura | G06K 9/469 382/103 |
| 2013/0094745 A1* | 4/2013 | Sundar | G06T 3/0068 382/132 |

OTHER PUBLICATIONS

DP Zhang, "Coronary Artery Segmentation and Motion Modelling," Imperial College London PhD Thesis, Jun. 2010.*
A Myronenko and X Song, "Point Set Registration: Coherent Point Drift," IEEE Trans. Pattern Analysis and Machine Intelligence, vol. 32, No. 12, pp. 2262-2275, Dec. 2010.*
J Jomier and SR Aylward, "Rigid and Deformable Vasculature-to-Image Registration: A Hierarchical Approach," Medical Image Computing and Computer-Assisted Intervention—MICCAI 2004 Lecture Notes in Computer Science vol. 3216, 2004, pp. 829-836.*
A. L. Yuille et al., "A Mathematical Analysis of the Motion Coherence Theory," International Journal of Computer Vision, vol. 3, pp. 155-175, 1989.

(Continued)

*Primary Examiner* — Matthew Bella
*Assistant Examiner* — Soo Shin

(57) ABSTRACT

Deformable, anatomical trees represented by scan data from different times are matched. Coherent point drift (CPD) solved using expectation maximization is enhanced with tangent or other curve information. By including point-curve information, another characteristic than GMM-based probabilities are included in the cost function for matching. The angle information provided by the tangent, normal, or other point-curve measure may more likely match points in one set representing a tree to points in another set representing the tree.

20 Claims, 5 Drawing Sheets

(56) References Cited

OTHER PUBLICATIONS

K. Rohr et al., "Spline-based elastic image registration: integration of landmark errors and orientation attributes," Computer Vision and Image Understanding, vol. 90, pp. 153-168, 2003.

H. Chui et al., A new point matching algorithm for non-rigid registration, Abstract, Department of Computer and Information Science & Engineering, University of Florida, 2002.

K. V. Mardia et al., "Kriging and splines with derivative information," Biometrika, vol. 83, No. 1, pp. 207-221, 1996.

S. Joshi et al., "Comparing Distributions and Shapes using the Kernel Distance," Abstract, University of Utah, pp. 1-10, 2011.

J. N. Kaftan et al., "A Novel Multi-Purpose Tree and Path Matching Algorithm with Application to Airway Trees," Institute of Imaging and Computer Vision, Abstract, Proc. of SPIE vol. 6143, pp. 61430N-1-61430N10, 2006.

B. Jian et al., "Robust Point Set Registration Using Gaussian Mixture Models," IEEE Transactions on Pattern Analysis and Machine Intelligence, vol. 33, No. 8, pp. 1633-1645, 2011.

V. Gorbunova et al., "Lung CT Registration Combining Intensity, Curves and Surfaces," Abstract, IEEE, pp. 340-343, 2010.

A. Myronenko et al., "Point Set Registration: Coherent Point Drift," IEEE Transactions on Pattern Analysis and Machine Intelligence, vol. 32, No. 12, pp. 2262-2275, 2010.

F. L. Bookstein et al., "A Feature Space for Edgels in Images with Landmarks," Journal of Mathematical Imaging and Vision, vol. 3, pp. 231-261, 1993.

R. Bhagalia et al., "Bi-Directional Labeled Point Matching," Abstract, IEEE, pp. 380-383, 2010.

S. Habert et al., "Registration of Multiple Temporally Related Point Sets Using a Novel Variant of the Coherent Point Drift Algorithm: Application to Coronary Tree Matching," Abstract, vol. 2, pp. 2-11, 2013.

P. J. Besl et al., "A Method for Registration of 3-D Shapes," IEEE Transactions on Pattern Analysis and Machine Intelligence, vol. 14, No. 2, pp. 239-256, 1992.

H. Chui et al., "A Feature Registration Framework Using Mixture Models," In: Proceedings of the IEEE Workshop on Mathematical Methods in Biomedical Image Analysis, IEEE Computer Society, vol. 190, 2000.

* cited by examiner

DEFORMABLE TREE MATCHING WITH TANGENT-ENHANCED COHERENT POINT DRIFT

RELATED APPLICATIONS

The present patent document claims the benefit of the filing date under 35 U.S.C. §119(e) of Provisional U.S. Patent Application Ser. No. 61/733,137, filed Dec. 4, 2012, which is hereby incorporated by reference.

BACKGROUND

The present embodiments relate to tree matching in medical imaging. Deformable point-set matching is performed for medical image analysis and computer vision. Tree matching arises in a variety of situations, such as for coronary tree matching for enhanced multiphase cardiac CT reconstruction and lung airway tree matching. The goal is to match the tree at one point in time to the tree at another point in time. The task may be difficult to implement with a computer and too data intensive to implement manually.

In "Point Set Registration: Coherent Point Drift," IEEE Transactions on Pattern Analysis and Machine Intelligence, 32 (2010) 2262-2275, Myronenko, et al. introduced a coherence point drift (CPD) approach to tree matching. The regularization term in the deformable (non-rigid) version of the CPD algorithm is based upon the motion coherency theory. CPD uses the probabilistic, outlier-resistant Gaussian mixture model (GMM) and expectation-maximization framework to find a transform from one tree to another. The GMM model provides a probabilistic version of least-squares point matching terms. However, there is some inaccuracy in the tree matching using CPD. A more accurate transform may assist medical professionals.

BRIEF SUMMARY

By way of introduction, the preferred embodiments described below include methods, systems, instructions, and computer readable media for matching deformable, anatomical trees represented by scan data. CPD solved using expectation maximization is enhanced with tangent or other curve information. By including point-curve information, another characteristic than GMM-based probabilities are included in the cost function for matching. The angle information provided by the tangent, normal, or other point-curve measure may more likely match points in one set representing a tree to points in another set representing the tree.

In a first aspect, a method is provided for matching deformable, anatomical trees represented by scan data. A medical imaging system acquires the scan data representing a tree structure of a patient at first and second times. A processor calculates tangents along the tree structure at the first time and at the second time from the scan data. The processor matches the tree structure at the first time with the tree structure at the second time. The matching is performed with coherent point drift where the tangents are included as part of a cost function of the coherent point drift. The processor outputs an image representing the matched tree structure from the first and second times.

In a second aspect, a non-transitory computer readable storage medium has stored therein data representing instructions executable by a programmed processor for matching deformable, anatomical trees represented by scan data. The storage medium includes instructions for determining a first tangent of a first point from a first tree structure in a first set and a second tangent of a second point of a second tree structure in a second set, calculating a probability of the first point matching the second point as a function of a Gaussian mixture model and a difference between the first and second tangents, and solving for a displacement of the first point of the first tree structure to the second tree structure as a function of the probability.

In a third aspect, a system is provided for matching deformable, anatomical trees represented by scan data. A medical imaging system is configured to scan a branching anatomy of a patient at different times. The branching anatomy has different positions at the different times. A processor is configured to match point-sets representing the branching anatomy of the patient at different times as a function of point-curve relationships within each of the point sets and a probabilistic Gaussian model.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Deformable geometric tree matching uses a variant of the coherent point drift (CPD) algorithm. The variant enhances CPD with tangent information. Tangent is used below, but other measures of the angle or curvature along the curve of the tree structure may be used, such as the normal.

Point-sets in the form of tree structures are registered. Building upon the fast, outlier-resistant CPD algorithm, point-curve relationships within the point sets are incorporated by using tangent information, resulting in enhanced matching capabilities. The speed and robustness of the CPD algorithm within an expectation-maximization optimization framework is preserved by deriving expectation and maximization steps that incorporate the tangent information. Rapid solution may be provided, even with the tangent enhancement, using Fast Gauss transform (FGT) along with a fast linear system solver. A global registration cost function containing new tangent matching terms is minimized using the expectation maximization. Using the CPD algorithm enhanced with tangent information over a straightforward pair-wise approach may be more accurate in matching coronary trees derived from cardiac CT data.

The tangent information is derived from the original point set, so the point matching likelihood is not statistically independent from the tangent matching likelihood. Nevertheless, such independence is assumed within the GMM model for computational ease and to maintain the similarities with other matching cost functions. For similar reasons, the CPD algorithm assumes statistical independence across the point dimensions in the point matching term.

Figure 1:
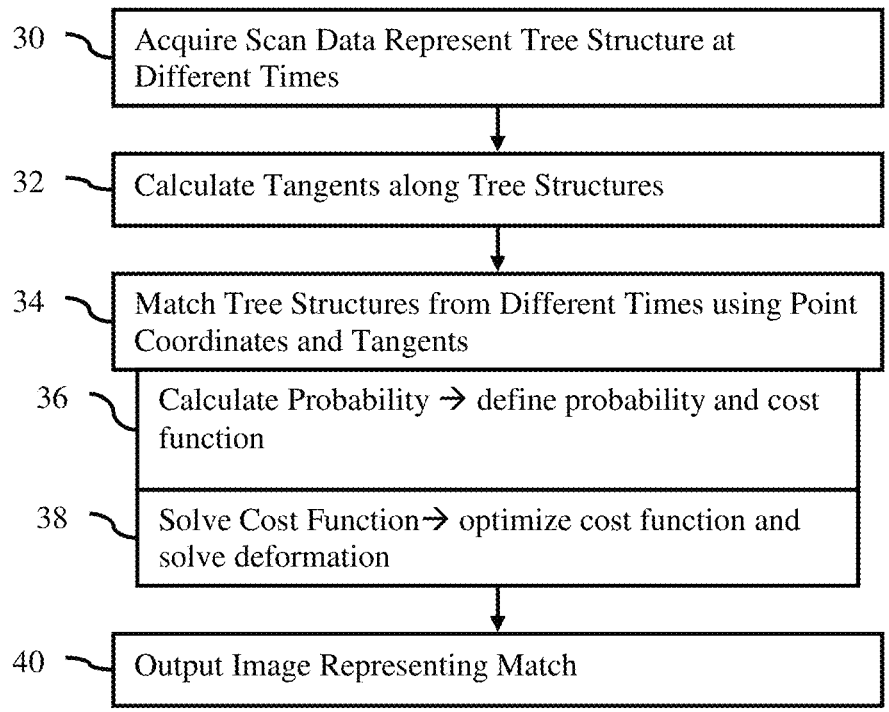
FIG. 1 is a flow chart diagram of one embodiment of a method for matching deformable, anatomical trees represented by scan data.

FIG. 1 shows one embodiment of a method for matching deformable, anatomical trees represented by scan data. The method is performed by the system of FIG. 6, a processor, or a different system. A processor of the system, processor of a medical imaging system, or other processor implements software to perform one or more of the acts of FIG. 1. For example, the processor performs acts 32, 34, 36, 38, and 40. The input is scan data or point sets derived from scan data. The output is a suggested transform, aligned data, multiple aligned trees, or other indication of relationship between the tree structures from different times.

The method is performed in the order shown or a different order. Additional, different, or fewer acts may be provided. For example, act 40 is not provided as the transform is used in other processes instead of an image showing the match or derived from the match. As another example, acts for transforming one representation to another and/or acts for calculating characteristics using the transform are performed.

In act 30, scan data is acquired. The scan data is acquired by scanning a patient in two or three dimensions (e.g., planar or volume scanning). Any scanning may be used. For example, x-rays are used by a computed tomography (CT) system to scan the patient (e.g., spiral scan). In other example, magnetic resonance, ultrasound, positron emission, single photon emission computed tomography, or other scanning is used. Alternatively, the scan data is acquired from a memory, such as loading the scan data from a picture archiving and communications system. Data previously acquired with a medical imaging system may be loaded as the scan data.

The scan data is at any stage of processing. For example, the scan data is raw data or data as detected from scanning the patient. As another example, the data is processed, such as filtered or image processed. The scan data may be processed to be a set of voxels, point data, or curves representing the tree structure. In other examples, the scan data is image data. Image data may refer to an actually displayed image or to the frame of data for generating the display.

The scan data is acquired as a frame of data. Other groupings than frames may be used. The frame represents an entire scan region, planar region, or volume region of the patient at a given time.

The scan data represents a region of a patient. The region includes any organ, tissue, bone, structure, or implant. By scanning the region, data representing a tree structure is acquired. Any tree structure may be represented. In one embodiment, the scan data represents a coronary tree for matching in multi-phase cardiac spiral CT. Contrast agents, segmentation, and/or image processing may be used to isolate the scan data representing the coronary tree. Other tree structures may be represented, such as passages in the lungs.

Scan data representing the tree structure is acquired for different times. The tree structure at one time is to be matched to the tree structure at a different time. The deformation of the tree structure is to be determined. For the coronary example, the scan data represents the coronary tree (e.g., vessels and/or arteries) at different phases of the cardiac cycle (e.g., one data set representing the end systolic phase and another data set representing the end diastolic phase). The scan data representing the different phases may be acquired during different cycles or the same cycle. As another example, the patient is scanned days, weeks, or months apart. In alternative embodiments, the tree structure derived from a scan of the patient is matched to a model or expected tree structure.

For matching scan data representing the tree structure at one time to scan data representing the tree structure at another time, the two sets of scan data are processed to provide ordered sets or are acquired as ordered sets. Any processing may be used, such as skeletonization, region shrinking, edge detection, centerline detection, or curve fitting. A curve or curves representing the tree structure at a given time are sampled to provide an ordered set of scan data representing the tree structure. Continuous curves may be used in other embodiments.

The matching is to provide a motion field or transform matching one set to another set (e.g., match the tree structures from different times). v is a motion field from the source point-set to a target point-set. The source is either the earlier or later occurring tree structure. D is the dimension of the point sets (e.g., 2D or 3D). In one embodiment using discrete point sets, N is the number of points in the target point set. M is the number of points in the source point set. $X_{N \times D} = (x_1, \ldots, x_N)^T$ is the target point set, and $Y_{M \times D} = (y_1, \ldots, y_M)^T$ is the source point set. $M_c$ is the number of curves in the source point set (e.g., number of curves in the tree structure).

The desired motion for matching the two data sets is a non-rigid transformation. The transformation T applied on Y is represented as $T(Y,v) = Y + v(Y)$. X is viewed as a realization of a Gaussian mixture model (GMM) fit to transformed (i.e. deformed) Y.

Figure 2:
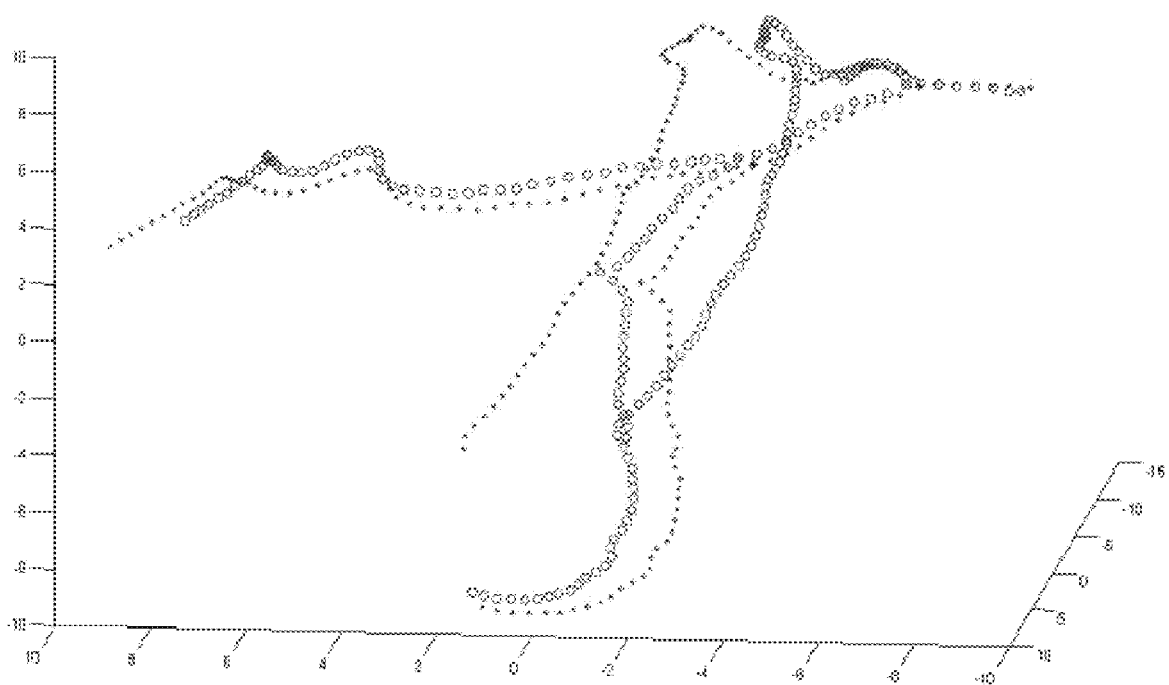
FIGS. 2 and 3 show example point-sets representing different tree structures at different times.
Figure 3:
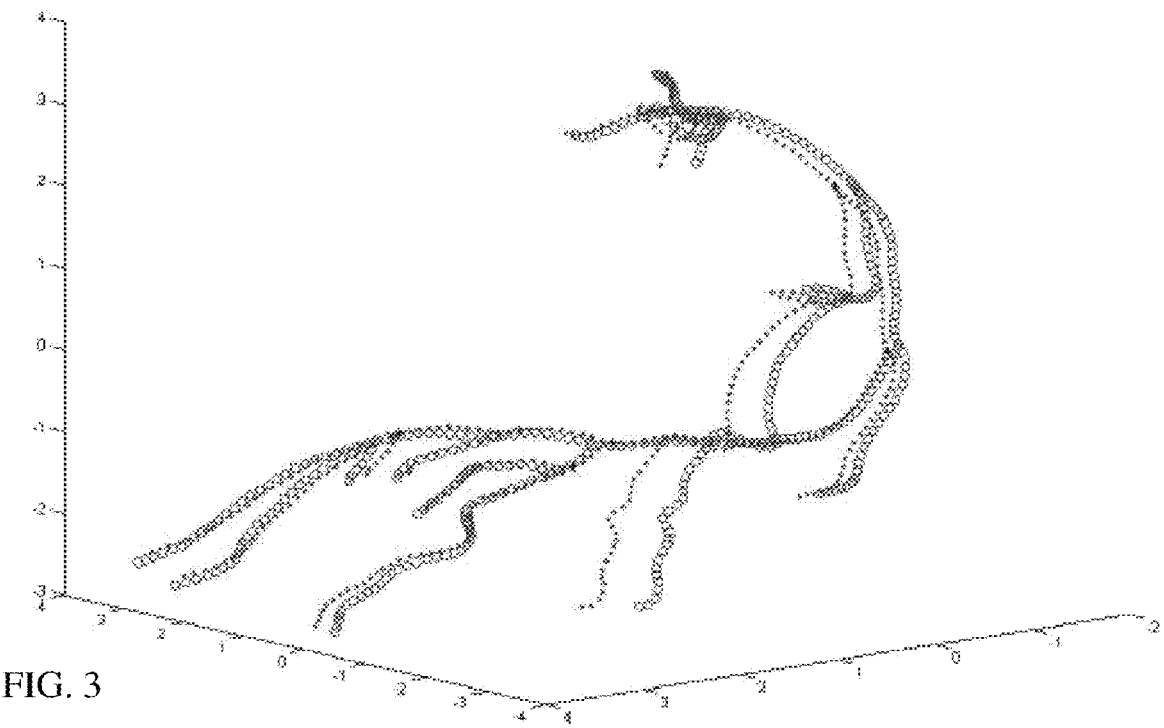

FIGS. 2 and 3 show two example coronary trees from CT data representing patients at different times. In each of FIGS. 2 and 3, the tree structure is represented by discrete points in three dimensions with each set of points representing the tree at different times. One set is shown as dots and the other set is shown as circles. For these examples, the coronary tree from the quiet phase is the target point-set and a deformed version of this tree (i.e., deformed version obtained via a simulated smooth non-rigid deformation) is the source. In alternative embodiments, the source may be from the quiet phase. Other phases may be used.

In act 32, tangents or other measures of the point-curve along the tree structure are calculated. A processor calculates the tangents for each of the sets. Tangents for the tree structure from one time are determined. Tangents for the tree structure at the other time are also determined. One or more tangents are determined for the tree structure at different times.

Any sampling density may be used, such as calculating a tangent for each discrete point in a given ordered set of data. Where the scan data represents a continuous line, tangents may be determined along the curve at any frequency.

Any tangent calculation may be used. In one embodiment using discrete points to represent the tree structure, surrounding points are used to determine the tangent. Immediately adjacent (e.g., earlier and later points along the curve or tree) points are used. For example, the tangent is labeled as t. The tangent may be determined as a difference between surrounding points. This is a vector calculation to determine the tangent at the point. For the target, the tangent calculation may be represented as $t_{xn} = (x_{n+1} - x_{n-1})/2$. For the end points, $t_{xN} = x_N - x_{N-1}$ and $t_{x1} = x_2 - x_1$. The same representation and corresponding calculations are used for the source.

In act 34, the tree structures from the different times are matched. The tree structure from one time is matched to the deformed tree structure at another time. The processor calculates a transform representing the motion field or deformation. One or more points in the tree structure at one time are identified in the deformed tree structure from another time. For the discrete representation, the points in one data set are matched to the closest points in the other data set.

The matching is performed using coherent point drift (CPD). The CPD approach includes a Gaussian mixture model (GMM) as a cost function for solving the transform between the two data sets. Probabilities of each point from one set matching points of other sets are calculated using the GMM in the CPD in act 36. The component density for the GMM, p(x|m), which predicts the location of a target point x given a source point index for source point $y_m$, is specified. When combined with a regularization strength parameter $\lambda$ (i.e., smoothness constraint), a regularization bandwidth parameter $\beta$, and an outlier percentage w (e.g., uniform distribution weight), the CPD cost function E is provided. In one embodiment, $\lambda=3$, $\beta=2$, and w=0.05, but other values may be used. The values are set, predetermined, or selected. Additional, different, or fewer constraints, regularization terms, or other considerations may be included in the cost function.

The tangent information from act 32 is included in the matching calculations. The CPD is modified or enhanced to include tangent or other point-curve information. The probabilities are a function of both the GMM and tangents included in the cost function of the CPD. Any function relating the tangents from one set to another may be used. For example, a simple difference is used. A difference between a tangent from one set and a tangent from another set indicates or weights the probability of the associated points matching. The probability for a given possible match or the probabilities for the various possible matches are functions of the differences between tangents.

For pedagogical reasons, one embodiment of the tangent-enhanced CPD cost function and algorithm is mathematically presented for the case of matching an individual curve, and then the multi-curve generalization is presented. In single curve matching, the CPD GMM point-matching likelihood term is modified by considering the tangent vectors $t_x$ and $t_y$ at two arbitrary points of the target and the source, respectively. The GMM probability density function becomes:

$$p(x|m) = \frac{1}{(2\pi\sigma^2)^{D/2}} \exp^{-\frac{\|x-y_m\|^2}{2\sigma^2}} \frac{1}{(2\pi\sigma_t^2)^{D/2}} \exp^{-\alpha \frac{\|t_x - t_{y_m}\|^2}{2\sigma_t^2}}$$

where $\sigma$ and $\sigma_t$ are kernel sizes for the GMM and the tangents, respectively, and $\alpha$ is a constant, such as 1. In other embodiments, $\alpha$ is redundant given $\sigma_t$, so is not provided. $\alpha$ may be manually set to change the influence of the tangent information while turning off the $\sigma_t$ iterative updates. In this representation, the probability p is calculated as exponential function of differences between tangents and differences between locations of the tree structure at the first time and the tree structure at the second time. Other representations may be used. The tangent may be included in another function, such as without an exponential term.

In act 38, the cost function is optimized. Any solution may be used. In one embodiment, an iterative solution is performed. Any iterative approach may be used, such as expectation maximization. The cost function, including the calculation of the probability in act 36, is solved in act 38 with expectation maximization.

The solution provides the displacement field for the tree structure. The displacement of the tree from one set (e.g., source) to another set (e.g., target) is found using the probability with the incorporated tangent information.

In the iterative expectation maximization framework, the expectation step provides a surrogate objective function Q lying above the expectation. In the maximization step, the surrogate Q is minimized by solving a corresponding Euler-Lagrange or other equation. This leads to a linear system with the various terms rapidly computable using a Fast Gauss transform (FGT). Compared to the original CPD algorithm, the surrogate Q function is augmented with an additional term induced by the tangent matching probabilities.

At each expectation maximization iteration, the corresponding surrogate objective function optimized in the maximization step then becomes:

$$Q(v, \sigma^2, \sigma_t^2) = F(\sigma^2, v) + G(\sigma_t^2, v) + \frac{\lambda}{2}\|Pv\|^2$$

with $$F(\sigma^2, v) = \frac{1}{2\sigma^2}\sum_{m,n=1}^{M,N} p^{old}(m|x_n)\|x_n - (y_m + v(y_m))\|^2 + \frac{N_P D}{2}\log(\sigma^2) \text{ and}$$

$$G(\sigma_t^2, v) = \frac{1}{2\sigma_t^2}\sum_{m,n=1}^{M,N} p^{old}(m|x_n)\|t_{x_n} - (t_{y_m} + v(y_m))\|^2 + \frac{N_P D}{2}\log(\sigma_t^2).$$

In order to find the triplet $(\sigma^*, \sigma_t^*, v^*)$ that minimizes Q, the corresponding Euler-Lagrange equation is used:

$$\frac{\partial F}{\partial v}(z) + \frac{\partial G}{\partial v}(z) + \lambda \hat{P} P v(z) = 0 \quad (1)$$

for vectors z, which represents all the unknowns, i.e $\sigma^*, \sigma_t^*$, $v^*$ in a vector form, and where $\hat{P}$ is the adjoint operator to P.

Given the calculated tangents, $c^2_{m,n} = p(m|x)/4\lambda \sigma_t^2$ and $z_{m,n} = ktx_n - ty_m$ with $k = (M-1)/(N-1)$. k is the normalization factor for the tangents. Other or no normalization factors may be used. The curves are assumed to be equally sampled, but unequal sampling may be used. G may be written for one curve as:

$$G(\sigma_t^2, v) = \frac{1}{2}\sum_{m=2}^{M-1}\sum_{n=1}^{N} c_{m,n}^2 \|2z_{m,n} - v(y_{m+1}) + v(y_{m-1})\|^2 + \frac{N_P D}{2}\log(\sigma_t^2) +$$
$$2\sum_{n=1}^{N} c_{1,n}^2 \|z_{1,n} - v(y_2) + v(y_1)\|^2 + 2\sum_{n=1}^{N} c_{M,n}^2 \|z_{M,n} - v(y_M) + v(y_{M-1})\|^2$$

Let $D_{n,m} = \|z_{m,n} - v(y_{m+1}) + v(y_{m-1})\|^2$. In order to calculate the partial derivative of $D_{n,m}$ with respects to v, $D_{n,m}$ is written as an integral and the dirac distribution is used as follows:

$$D_{n,m}(v) = \int\int \|(z_{m,n} - v(t) + v(t'))\|^2 \delta(t - y_{m+1})\delta(t' - y_{m-1}) dt dt'$$
$$= \underbrace{\int (z_{m,n} - v(t))^2 \delta(t - y_{m+1}) dt}_{A(v)} + \underbrace{\int (v(t))^2 \delta(t - y_{m-1}) dt}_{B(v)} +$$

-continued $$2\underbrace{\int (z_{m,n}-v(t))^2\delta(t-y_{m+1})dt}_{C1(v)} \underbrace{\int (v(t))\delta(t-y_{m-1})dt}_{C2(v)}$$

In order to find the derivative of A with respects to v, A is written as:

$$A(v+\epsilon u)\approx A(v)+<\nabla_v A,\epsilon u>, \text{ hence}$$

$$\nabla_v A(z)=-2(z_{m,n}-v(y_{m+1}))\delta(z-y_{m+1})$$

The same approach is applied to find the derivative of B(v) and C(v)=C1(v)×C2(v), resulting in:

$$\nabla_v B(z)=2v(y_{m-1})\delta(z-y_{m-1})$$

$$\nabla_v C_1(z)=-\delta(z-y_{m+1})$$

$$\nabla_v C_2(z)=\delta(z-y_{m-1})$$

$$\nabla_v C(z)=\delta(z-y_{m-1})(z_{m,n}-v(y_{m+1}))-\delta(z-y_{m+1})v(y_{m-1})$$

The final result is:

$$\frac{\partial D_{n,m}}{\partial v}(z)=-2(\delta(z-y_{m+1})-\delta(z-y_{m-1}))(z_{m,n}-v(y_{m+1})+v(y_{m-1}))$$

Let $c^1_{m,n}=p(m|x)/\lambda\sigma^2$. The Euler-Lagrange equation becomes:

$$\hat{P}Pv(z)=\sum_{m,n=1}^{M,N} c^1_{m,n}(x_n-(y_m+v(y_m))\delta(z-y_m)+$$

$$\sum_{m=2}^{M-1}\sum_{n=1}^{N} c^2_{m,n}(z_{m,n}-v(y_{m+1})+v(y_{m-1}))(\delta(z-y_{m+1})-\delta(z-y_{m-1}))+$$

$$4\sum_{n=1}^{N} c^2_{1,n}(z_{1,n}-v(y_2)+v(y_1))(\delta(z-y_2)-\delta(z-y_1))+$$

$$4\sum_{n=1}^{N} c^2_{M,n}(z_{M,n}-v(y_M)+v(y_{M-1}))(\delta(z-y_M)-\delta(z-y_{M-1}))$$

The solution to such partial differential equation may be written as the integral transformation of its left side with a Green's function G of the self-adjoint operator P^P.

$$v(z)=\sum_{m,n=1}^{M,N} c^1_{m,n}(x_n-(y_m+v(y_m)))G(z,y_m)+$$

$$\sum_{m=2}^{M-1}\sum_{n=1}^{N} c^2_{m,n}(z_{m,n}-v(y_{m+1})+v(y_{m-1}))(G(z,y_{m+1})-G(z,y_{m-1}))+$$

$$4\sum_{n=1}^{N} c^2_{1,n}(z_{1,n}-v(y_2)+v(y_1))(G(z,y_2)-G(z,y_1))+$$

$$4\sum_{n=1}^{N} c^2_{M,n}(z_{M,n}-v(y_M)+v(y_{M-1}))(G(z,y_M)-G(z,y_{M-1}))=$$

$$\sum_{m=1}^{M} w_m G(z,y_m)$$

The solution may be constrained with one or more regularization terms. For the regularization term, a Gaussian filter is used. Other or no regularization functions may be used. The Gaussian filter may be represented as $G(y_i,y_j)=e^{-(1/2)\|(y_i-y_j)/\beta\|^2}$. The β parameter allows control of the range of filtered frequencies and, therefore, the spatial displacement smoothness. The coefficients $w_m$ are obtained by writing W as W=−HV+B. And then, since V=GW, the displacement field V is found by the solving the equation: V=GW=G(−HV+B)=−GHV+GB. Hence, (GH+I)V=GB.

By solving for v(z), H may be written as H=D+S where D is a diagonal matrix and S is a symmetric matrix, both defined by:

$$D_{m,n}=\Sigma_{n=1}^{N}c_{m,n}^1+\Sigma_{n=1}^{N}c_{m-1,n}^2+\Sigma_{n=1}^{N}c_{m+1,n}^2 \text{ if } 1<m<M$$

$$D_{1,1}=\Sigma_{n=1}^{N}c_{1,n}^1 \text{ and } D_{M,M}=\Sigma_{n=1}^{N}c_{M,n}^1$$

and $$S_{m,m+2}=-\Sigma_{n=1}^{N}c_{m+1,n}^2 \text{ if } 1\leq m\leq M-2$$

$$S_{1,2}=-4\Sigma_{n=1}^{N}c_{1,n}^2 \text{ and } S_{M-1,M}=-4\Sigma_{n=1}^{N}c_{M,n}^2$$

$$S_{1,1}=4\Sigma_{n=1}^{N}c_{1,n}^2+\Sigma_{n=1}^{N}c_{2,n}^2 \text{ and } S_{M,M}=4\Sigma_{n=1}^{N}c_{M,n}^2+\Sigma_{n=1}^{N}c_{M-1,n}^2$$

$$S_{2,2}=3\Sigma_{n=1}^{N}c_{1,n}^2 \text{ and } S_{M-1,M-1}=3\Sigma_{n=1}^{N}c_{M,n}^2$$

$$S_{m,n}=0 \text{ elsewhere.}$$

The vector B is provided with the following definition:

$$B_m=\Sigma_{n=1}^{N}(c_{m,n}^1(x_n-y_m)+c_{m-1,n}^2z_{m-1,n}-c_{m+1,n}^2z_{m+1,n}) \text{ if } 3\leq m\leq M-2$$

$$B_1=\Sigma_{n=1}^{N}(c_{1,n}^1(x_n-y_1)-c_{2,n}^2z_{2,n}-4c_{1,n}^2z_{1,n})$$

$$B_2=\Sigma_{n=1}^{N}(c_{2,n}^1(x_n-y_2)-c_{3,n}^2z_{3,n}+4c_{1,n}^2z_{1,n})$$

$$B_{M-1}=\Sigma_{n=1}^{N}(c_{M-1,n}^1(x_n-y_{M-1})-c_{M-2,n}^2z_{M-2,n}-4c_{M,n}^2z_{M,n})$$

$$B_M=\Sigma_{n=1}^{N}(c_{M,n}^1(x_n-y_M)+c_{M-1,n}^2z_{M-1,n}^2z_{M-1,n}+4c_{M,n}^2z_{M,n})$$

The transformed positions of $y_m$ are found as T=T(Y,V)=Y+V. $\sigma^2$ and $\sigma_t^2$ are obtained by equating the corresponding derivatives of Q to zero:

$$\sigma^2=\frac{1}{N_PD}\sum_{m,n=1}^{M,N} p^{old}(m|x_n)\|x_n-T(y_m,W)\|^2$$

$$=\frac{1}{N_PD}(tr(X^Td(P^T1)X)-2tr((PX)^TT)+tr(T^Td(P1)T))$$

and $$\sigma_t^2=\frac{1}{4N_PD}\sum_{m,n=1}^{M,N} p^{old}(m|x_n)\|t_{x_n}-t_{T(y_m,W)}\|^2$$

$$=\frac{1}{N_PD}(k^2tr(TX^Td(P^T1)TX)-2ktr((PTX)^TTT)+2tr(TT^Td(P1)TT))$$

where TX=is the vector of X tangents and TT=is the vector of T tangents.

This solution is provided for single-curve matching. The multi-curve matching remains a point set-matching problem, but with special conditions at the branch points and the end points. The same approach used for a single curve is used, but with consideration of multiple end/branch points. The H matrix keeps the same structure $H^{mul}=D^{mul}+S^{mul}$, but is more complex and is composed by $M_c$ ($M_c$ is the number of source curves) sub-matrices that describe the boundary conditions for each curve.

$$H^{mul} = \begin{pmatrix} S_1^{mul}+D_1^{mul} & 0 & \cdots & 0 \\ 0 & S_2^{mul}+D_2^{mul} & \cdots & 0 \\ \vdots & \vdots & \ddots & \vdots \\ 0 & 0 & \cdots & S_{M_c}^{mul}+D_{M_c}^{mul} \end{pmatrix}$$

Every matrix $S^{mul}_{i\{i\in[1,M_c]\}}$ corresponding to one source curve with size $m_i$ is defined by:

$$S_i^{mul} = \sum_{n=1}^{N} \begin{pmatrix} 4c_{i_l,n}^2+c_{i_l+1,n}^2 & -4c_{i_l,n}^2 & -c_{i_l,n}^2 & 0 & \cdots & \cdots & 0 \\ -4c_{i_l,n}^2 & 3c_{1,n}^2 & 0 & \ddots & \ddots & & \vdots \\ -c_{i_l+1,n}^2 & 0 & 0 & \ddots & \ddots & \ddots & \vdots \\ 0 & \ddots & \ddots & \ddots & \ddots & \ddots & 0 \\ \vdots & \ddots & \ddots & \ddots & 0 & 0 & -c_{i_l+m_i-2,n}^2 \\ \vdots & & \ddots & \ddots & 0 & 3c_{i_l+m_i-1,n}^2 & -4c_{i_l+m_i-1,n}^2 \\ 0 & \cdots & \cdots & 0 & -c_{i_l+m_i-2,n}^2 & -4c_{i_l+m_i-1,n}^2 & 4c_{i_l+m_i-1,n}^2+c_{i_l+m_i-2,n}^2 \end{pmatrix}$$

where $i_l$ is the index in Y of the first point in $S^{mul}$. The structure of the diagonal matrix $D^{mul}$ is similar:

$$D_i^{mul} = \sum_{n=1}^{N} \begin{pmatrix} c_{i_l,n}^1 & 0 & \cdots & \cdots & 0 \\ 0 & c_{i_l+1,n}^1+c_{i_l,n}^2+c_{i_l+2,n}^2 & \ddots & & \vdots \\ \vdots & \ddots & \ddots & \ddots & \vdots \\ \vdots & & \ddots & c_{i_l+m_i-2,n}^1+c_{i_l+m_i-3,n}^2+c_{i_l+m_i-1,n}^2 & 0 \\ 0 & \cdots & \cdots & 0 & c_{i_1+m_i-1,n}^1 \end{pmatrix}$$

As for the vector $B^{mul}$:

$$B^{mul} = \begin{pmatrix} B_1^{mul} \\ B_2^{mul} \\ \vdots \\ B_{M_c}^{mul} \end{pmatrix}$$

With, for each vector $B^{mul}_{i\{i\in[1,M_c]\}}$:

$$B_i^{mul} = \sum_{n=1}^{N} \begin{pmatrix} c_{1,n}^1(x_n-y_{i_l}) - c_{i_l+1,n}^2 z_{i_l+1,n} - 4c_{i_l,n}^2 z_{i_l,n} \\ c_{2,n}^1(x_n-y_{i_l}+1) - c_{i_l+2,n}^2 z_{i_l+2,n} + 4c_{i_l,n}^2 z_{i_l,n} \\ c_{i_l+2,n}^1(x_n-y_{i_l+2}) - c_{i_l+3,n}^2 z_{i_l+3,n} + c_{i_l+1,n}^2 z_{i_l+1,n} \\ \vdots \\ c_{i_l+m_i-3,n}^1(x_n-y_{i_l+m_i-3}) - c_{i_l+m_i-2,n}^2 z_{i_l+m_i-2,n} + c_{i_l+m_i-4,n}^2 z_{i_l+m_i-4,n} \\ c_{i_l+m_i-2,n}^1(x_n-y_{i_l+m_i-2}) - 4c_{i_l+m_i-1,n}^2 z_{i_l+m_i-1,n} + c_{i_l+m_i-3,n}^2 z_{i_l+m_i-3,n} \\ c_{i_l+m_i-1,n}^1(x_n-y_{i_l+m_i-1}) + 4c_{i_l+m_i-1,n}^2 z_{i_l+m_i-1,n} + c_{i_l+m_i-2,n}^2 z_{i_l+m_i-,n} \end{pmatrix}$$

Whether a single curve or a multiple curve (e.g., FIG. 2 with three curves, and FIG. 3 with eleven curves), the tangent information is used with the GMM in the CPD cost function and solved iteratively using expectation maximization to match the tree structure at one time to the same tree structure at another time. Table 1 below provides pseudo-code for this solution. Table 1 represents one embodiment of implementation of the

TABLE 1

Algorithm 1 Enhanced CPD multi-curve registration

Initialization: $W = 0 \; \sigma^2 = \dfrac{1}{DNM} \sum\limits_{m,n=1}^{M,N} \|x_n - y_m\|^2,$ $\sigma_t^2 = \dfrac{1}{DNM} \sum\limits_{m,n=1}^{M,N} \|t_{x_n} - t_{y_m}\|^2$ Initialize $\omega (0 \leq \omega \leq 1), \beta > 0, \lambda > 0$ Construct G, $G_{ij} = \exp^{-\frac{1}{2\beta^2}\|y_i - y_j\|^2}$ and Z $(Z_{m,n} = z_{m,n})$ repeat
E-step: Compute P:

$P_{mn} = \dfrac{\exp^{-d_{m,n}}}{\sum\limits_{k=1}^{M} \exp^{-d_{m,n}} + \dfrac{w}{1-w} \dfrac{(2\pi\sigma^2\sigma_t^2)^{D/2}M}{N}}$ with:

$d_{m,n} = \dfrac{1}{2\sigma^2}\|x_n - (y_m + G(m,.)W)\|^2 + \dfrac{1}{2\sigma_t^2}\|t_{x_n} - t_{y_m + G(m,.)W}\|^2$ M-step:
 Compute $H^{mul}$ and $B^{mul}$
 Solve $(GH^{mul} + I)V = GB^{mul}$
 $T = Y + V$ and $N_p = 1^T P 1$
 Compute $\sigma^2$ and $\sigma_t^2$:

$\sigma^2 = \dfrac{1}{N_P D}(tr(X^T d(P^T 1) X) - 2tr((PX)^T T) + tr(T^T d(P1)T))$ and $\sigma_t^2 = \dfrac{1}{N_P D}(k^2 tr(TX^T d(P^T 1) TX) - 2ktr((PTX)^T TT) + 2tr(TT^T d(P1)TT))$ until convergence Any measure of convergence may be used. For example, σ, σ$_t$ and T are monitored through each iteration until one, multiple, or all change by only a limited or no amount. Alternatively, the probability or likelihood may be monitored for convergence.

Figure 4:
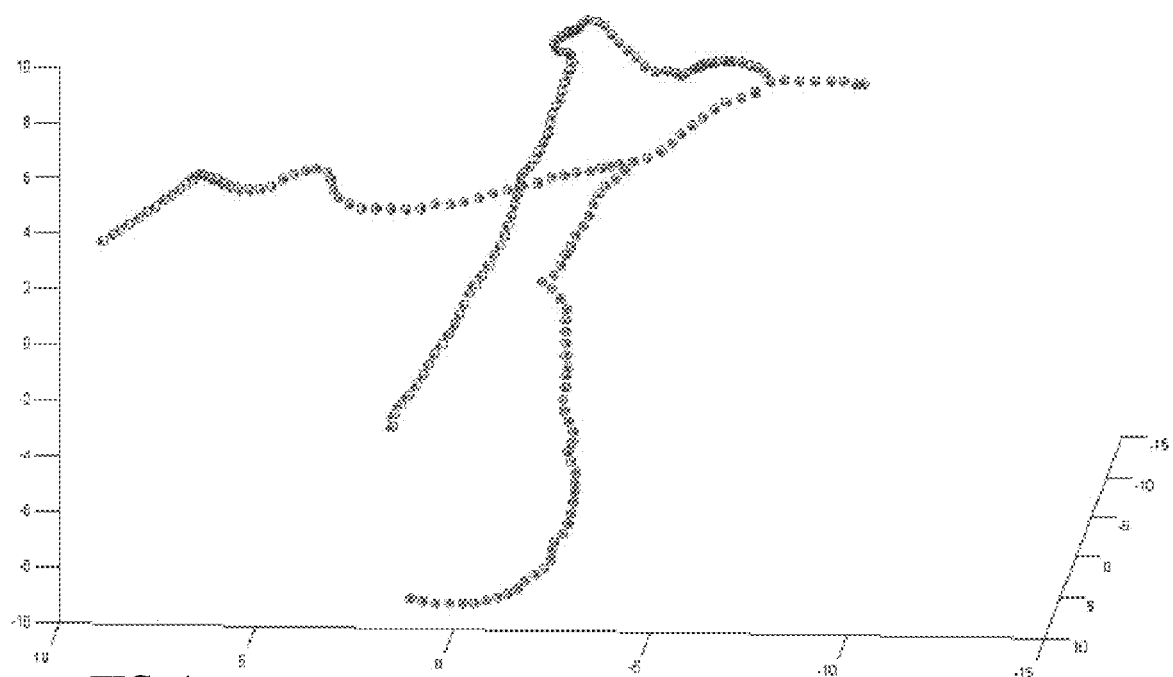
FIGS. 4 and 5 show the example point-sets of FIGS. 2 and 3, respectively, as aligned based on a transform determined from matching the point sets.
Figure 5:
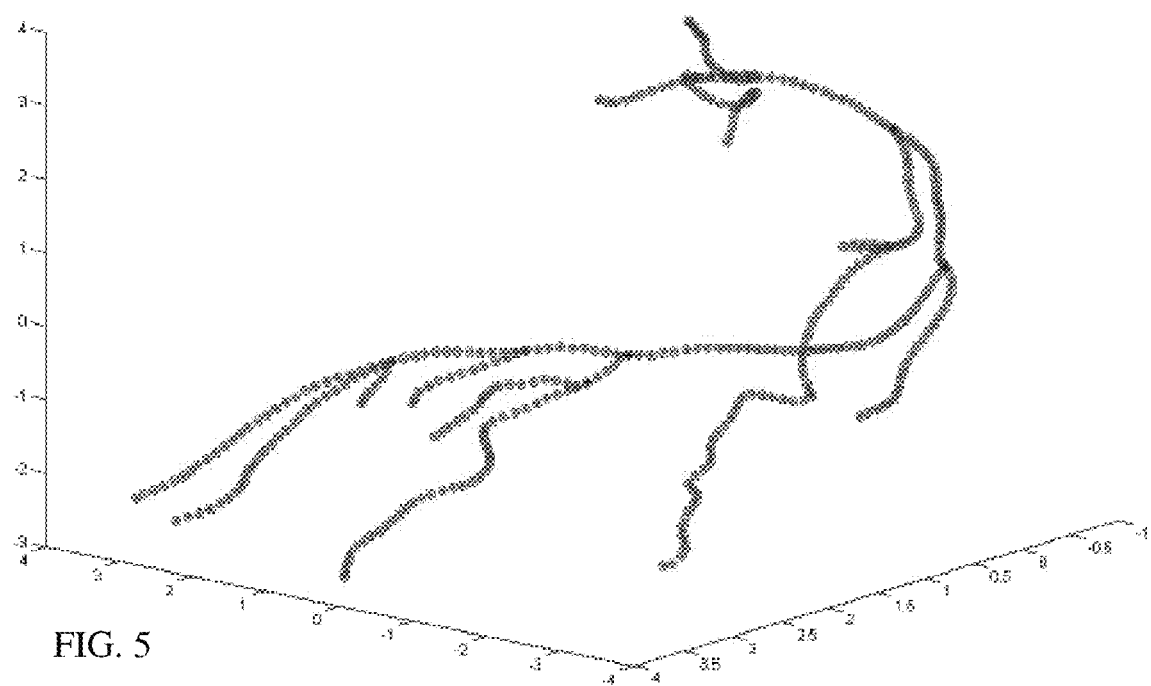

By incorporating the tangent matching in the CPD non-rigid matching, better results may be provided as compared to without the tangent matching. This may be especially true for branch points (i.e., bifurcation points). In order to quantify the quality of landmark matching, the sum of the distances between the landmarks in the target and in the source after the registration is calculated. Let $\{lx_i\}_{i \in [1;L]}$ be the set of L landmarks belonging to the target curves set, and $\{ly_i\}_{i \in [1;L]}$ be the corresponding landmarks in the source. The landmark distance is defined as $D_L$=square root of the sum from i=1 to L of $\|lx_i - ly_i\|^2$. The tangent-enhanced CPD algorithm gives a lower landmark error as compared to the CPD algorithm without tangent matching. For example, FIGS. 4 and 5 show the overlapping tree structures after transforming the target to the source using the tangent-enhanced CPD approach. Without tangent-enhancement, the CPD matching $D_L$=0.6583 mm, and with the tangent-enhanced CPD matching $D_L$=0.2476 mm for the example of FIGS. 2 and 4. Without tangent-enhancement, the CPD matching $D_L$=0.4531 mm, and with the tangent-enhanced CPD matching $D_L$=0.0020 mm for the example of FIGS. 3 and 5.

These improvements in matching may allow for improved cardiac CT reconstruction and visualization via accurate coronary tree motion compensation. Rigid and affine versions of the tangent-enhanced CPD algorithm may be used. A temporally consistent group-wise CPD algorithm with tangent-matching terms may be provided.

Referring again to FIG. 1, the processor outputs an image in act 40. The image represents the matched trees structure. For example, an image showing the trees structures, such as shown in FIGS. 4 and 5, is output. Alternatively, an image of the scanned tissue or other anatomy of the patient is output with the matched tree structure highlighted. The image shows the curves of the tree structure from one time overlaid with the curves of the tree structure at another time. The calculated transform is used to displace one of the tree structures for the overlay.

In other embodiments, multiple images are shown, such as images of the tree structures at different times. Displacement or other information may relate the position from one image of the tree structure to position in another image. A sequence of images may be shown showing the movement of the tree structure. The displacement may be used to calculate or interpolate tree position between the times for generating additional images.

In yet other embodiments, the calculated transform is used in reconstruction. The displacement is used to align the tree structure for combining data to reconstruct the tree structure with more information than provided with a scan at one time. The output image is of the tree structure and based, in part, on the displacements.

The image represents the matched tree structure with or without other tissue or anatomy information. Other information, such as a measure of matching accuracy, may be output.

Figure 6:
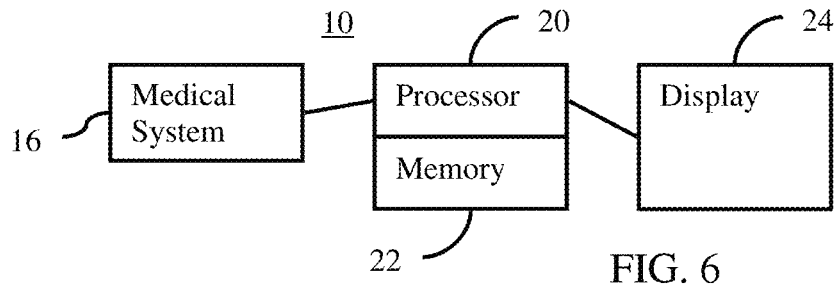
FIG. 6 is a block diagram of one embodiment of a system for matching deformable, anatomical trees represented by scan data.

FIG. 6 shows a system 10 for matching deformable, anatomical trees represented by scan data. The system 10 includes a medical imaging system 16, a processor 20, a memory 22, and a display 24. Additional, different, or fewer components may be provided. For example, a network or network connection is provided, such as for networking with a medical imaging network or data archival system. As another example, a user interface is provided. In yet another example, the medical system 16 is not provided. The data representing the patient is obtained from the memory 22.

The processor 20, memory 22, and display 24 are part of the medical imaging system 16 or other system. Alternatively, the processor 20, memory 22 and/or display 24 are part of an archival and/or image processing system, such as associated with a medical records database workstation or server. In other embodiments, the processor 20, memory 22, and/or display 24 are a personal computer, such as desktop or laptop, a workstation, a server, a tablet, a network, or combinations thereof.

The medical system 16 is any now known or later developed medical imaging system. For example, the medical system 16 is a computed tomography or other x-ray system (e.g., fluoroscopic). An x-ray source and detector are positioned opposite each other and adjacent to a patient and may be moved about the patient for scanning. In one embodiment, the medical system 16 is a spiral or C-arm computed tomography system. In other examples, the medical system 16 is a magnetic resonance, positron emission, ultrasound, single photon emission computed tomography, or other imaging system for scanning a patient.

The medical system 16 is configured by stored settings and/or by user selected settings to scan a branching anatomy of the patient at different times. The scan occurs by transmitting and receiving or by receiving alone. By positioning relative to the patient, aiming, and/or based on anatomy specific contrast agents, the branching anatomy is scanned. For example, the coronary tree is scanned. Other information, such as from other anatomy, may or may not be acquired as well.

The medical system 16 is configured to scan the branching anatomy at different times. A given scan may last any amount of time, but represents the branching anatomy at a particular time or phase. By performing multiple scans or by separating data from a given scan, data representing the branching anatomy as occurring at different times is obtained. Gating and/or triggering, such as based on an EKG, breathing monitoring, or on changes in the scan data itself, may be used to time the scans for the different times (e.g., different cardiac phases). Alternatively, the scans from different times are acquired based on a timer regardless of the patient physiological timing.

The memory 22 is a graphics processing memory, video random access memory, random access memory, system memory, cache memory, hard drive, optical media, magnetic media, flash drive, buffer, database, combinations thereof, or other now known or later developed memory device for storing data. The memory 22 is part of the imaging system 16, a computer associated with the processor 20, a database, another system, a picture archival memory, or a standalone device.

The memory 22 stores data representing a region of a patient. Multiple frames of data may be stored. The region is a two or three-dimensional region. The region is of any part of the patient, such as a region within the chest, abdomen, leg, head, arm, or combinations thereof. The data is from scanning the region. The data represents the branching structure in patient at different times.

The memory 22 may store processed data. For example, the results of filtering, image processing, segmenting, or other isolation of information associated with the branching structure are stored. Curves, voxels, or sample locations representing the branching structure at different times of the patient are stored. These representations derived from the information from scanning the patient are scan data.

The memory 22 or other memory is alternatively or additionally a computer readable storage medium storing data representing instructions executable by the programmed processor 20 for matching deformable, anatomical trees represented by scan data. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts, or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 20 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for matching tree structures. The processor 20 is a single device or multiple devices operating in serial, parallel, or separately. The processor 20 may be a main processor of a computer, such as a laptop or desktop computer, or may be a processor for handling some tasks in a larger system, such as in an imaging system. The processor 20 is configured by instructions, design, hardware, and/or software to be able to perform the acts discussed herein.

In one embodiment, the processor 20 is configured to match point-sets representing the branching anatomy of the patient at different times. The match is performed using point-curve relationships within each of the point sets and a probabilistic Gaussian model. The normal, tangent, or other measure of curvature or angle along the branching anatomy (e.g., within the point set representing the anatomy) is used as well as the GMM as a cost function of a coherent point drift solved iteratively with expectation maximization. Other approaches incorporating the tangent or other point-curve relationship may be used.

The processor 20 is configured to generate an image for display on the display 24. The matching information calculated by the processor 20 is used by the processor 20, by the medical system 16, or by another device to generate an image. The image represents the branching anatomy or is a function of displacements of the branching anatomy over time.

The display 24 is a monitor, LCD, projector, plasma display, CRT, printer, or other now known or later developed devise for outputting visual information. The display 24 receives images, graphics, or other information from the processor 20, memory 22, or medical system 16. One or more images representing the scanned patient are displayed. The images may be two-dimensional images. A planar or area region is represented in the image. In other embodiments, a volume is represented. An image is rendered from the volume.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for matching deformable, anatomical trees represented by scan data, the method comprising:
   acquiring, from a medical imaging system, the scan data representing a tree structure of a patient at first and second times;
   calculating, by a processor, tangents along the tree structure at the first time and tangents along the tree structure at the second time from the scan data acquired at the first and second times, respectively;

matching, by the processor, the tree structure at the first time with the tree structure at the second time, the matching being performed with coherent point drift where the tangents of both the first and second times are included as part of a cost function of the coherent point drift; and outputting, by the processor, an image representing the matched tree structure from the first and second times.

2. The method of claim 1 wherein acquiring comprises acquiring with the medical imaging system being a computed tomography system, the tree structure being a coronary tree, and the first and second times being different phases of a cardiac cycle.

3. The method of claim 1 wherein calculating comprises calculating the tangents for first points in the tree structure at the first and second times, the tangents calculated as a difference in second points surrounding the first points.

4. The method of claim 1 wherein matching comprises matching with the coherent point drift including a Gaussian mixture model as the cost function.

5. The method of claim 4 wherein matching comprises calculating a probability from the Gaussian mixture model, the probability being a function of point location coordinates and the corresponding tangents derived from the point location coordinates.

6. The method of claim 5 wherein calculating comprises calculating the probability as exponential functions of differences between tangents and differences between the point location coordinates of the tree structure at the first time and the tree structure at the second time.

7. The method of claim 1 wherein matching comprises iteratively solving the cost function with expectation maximization.

8. The method of claim 7 wherein iteratively solving comprises solving with a Fast Gauss transform along with a fast linear system solver.

9. The method of claim 7 wherein iteratively solving comprises solving for a displacement field of the tree structure at the first time relative to the second time.

10. The method of claim 7 wherein iteratively solving with the expectation maximization comprises solving with an expectation function including a term derived from Gaussian mixture model probabilities of matching tangent vectors.

11. The method of claim 1 wherein outputting the image comprises outputting the image with curves for the tree structure at the first time overlaid with curves for the tree structure at the second time displaced based on the matching.

12. A non-transitory computer readable storage medium having stored therein data representing instructions executable by a programmed processor for matching deformable, anatomical trees represented by scan data, the storage medium comprising instructions for:

determining a first tangent of a first point on a first tree structure in a first set and a second tangent of a second point on a second tree structure in a second set;

calculating a probability of the first point matching the second point as a function of a Gaussian mixture model and a difference between the first and second tangents; and solving for a displacement of the first point of the first tree structure to the second tree structure as a function of the probability.

13. The non-transitory computer readable storage medium of claim 12 wherein determining comprises determining where the first and second tree structures are discretely represented by first and second ordered sets, the first tangent being a function of a difference between locations of earlier and later points in the first ordered set and the second tangent being a function of a difference between locations of earlier and later points in the second ordered set.

14. The non-transitory computer readable storage medium of claim 12 wherein calculating and solving comprise performing an expectation maximization as a function of the probability.

15. The non-transitory computer readable storage medium of claim 12 wherein calculating comprises calculating in a coherent point drift.

16. The non-transitory computer readable storage medium of claim 12 wherein calculating and solving comprise matching the first point with a third point in the second tree structure.

17. The non-transitory computer readable storage medium of claim 12 wherein solving comprises constraining the solving with a regularization term.

18. A system for matching deformable, anatomical trees represented by scan data, the system comprising:

a medical imaging system configured to scan a branching anatomy of a patient at different times, the branching anatomy having different positions at the different times; and a processor configured to match point-sets representing the branching anatomy of the patient at different times as a function of point-curve relationships within each of the point sets and a probabilistic Gaussian model.

19. The system of claim 18 wherein the processor is configured to match with the point-curve relationships comprising tangents, and the probabilistic Gaussian model being used as a cost function of a coherent point drift solved iteratively with expectation maximization.

20. The system of claim 18 wherein the medical imaging system comprises a computed tomography system, wherein the branching anatomy comprises a coronary tree, and wherein the different times comprise different phases of a cardiac cycle.

* * * * *